Figure 1:
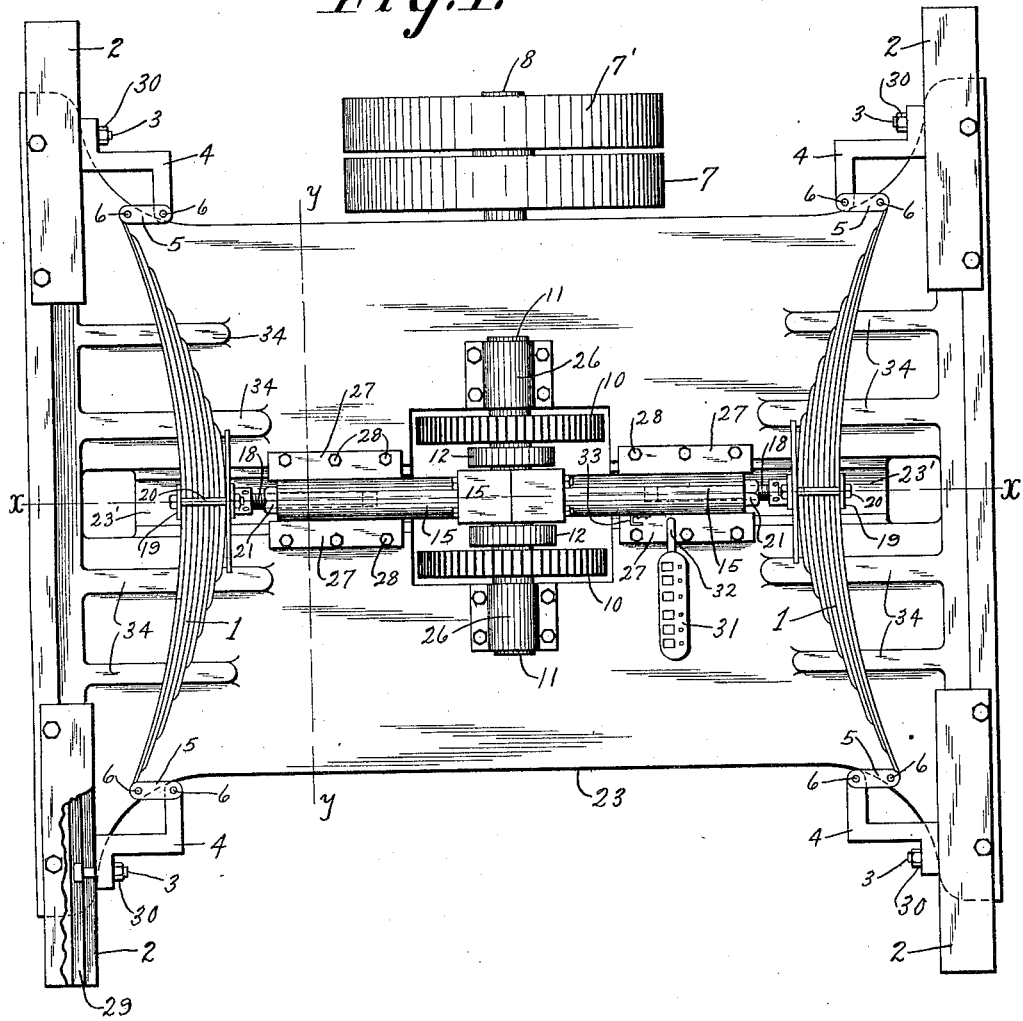

E. J. HARVEY.
MACHINE FOR TESTING VEHICLE SPRINGS.
APPLICATION FILED NOV. 1, 1913.

1,091,219.

Patented Mar. 24, 1914.
2 SHEETS—SHEET 1.

E. J. HARVEY.
MACHINE FOR TESTING VEHICLE SPRINGS.
APPLICATION FILED NOV. 1, 1913.
1,091,219.
Patented Mar. 24, 1914.
2 SHEETS—SHEET 2.
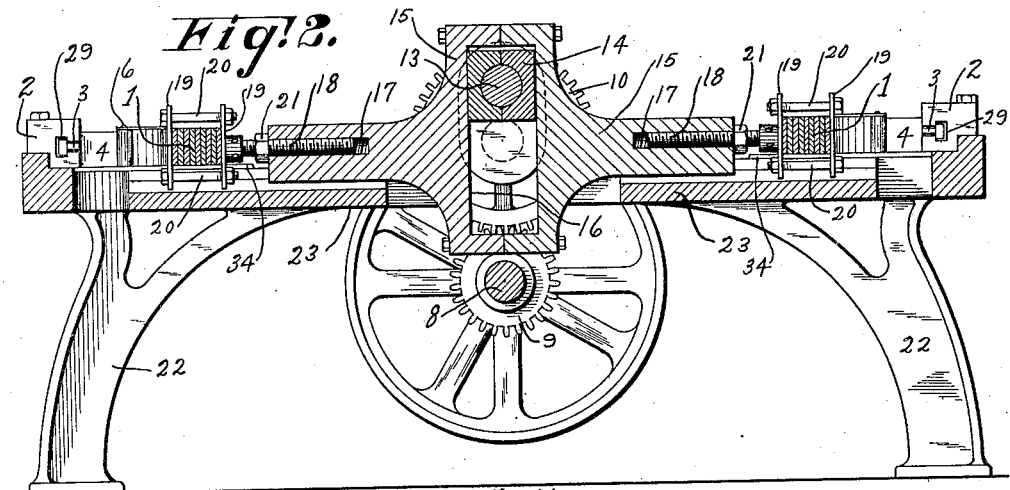
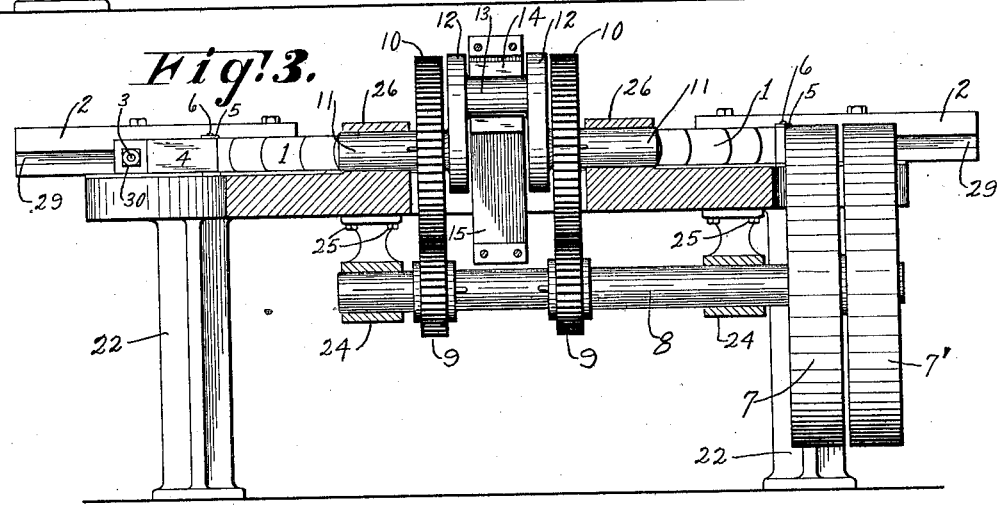
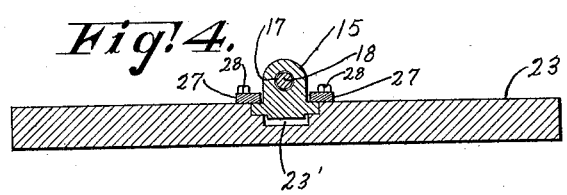

UNITED STATES PATENT OFFICE.

EDWARD J. HARVEY, OF RACINE, WISCONSIN, ASSIGNOR TO HARVEY SPRING AND FORGING COMPANY, OF RACINE, WISCONSIN, A CORPORATION.

MACHINE FOR TESTING VEHICLE-SPRINGS.

1,091,219.    Specification of Letters Patent.    Patented Mar. 24, 1914.

Application filed November 1, 1913. Serial No. 798,640.

*To all whom it may concern:*

Be it known that I, EDWARD J. HARVEY, a citizen of the United States, residing at Racine, county of Racine, and State of Wisconsin, have invented new and useful Improvements in Machines for Testing Vehicle-Springs, of which the following is a specification.

My invention relates to improvements in machines for testing the quality, strength and durability of vehicle springs under conditions which are practically the same as such springs are normally subjected to in actual use. In other words, the springs are not only subjected to a pressure which is substantially equal to a heavy load, but they are subjected to a continuous rapid vibratory movement which, if such springs were defective, might cause them to crystallize and break.

My invention also pertains, among other things, to the device for utilizing the expansive pressure of one spring which has been previously compressed to compress another spring, whereby the power required to operate the machine is reduced to the minimum.

My invention is further explained by reference to the accompanying drawings in which—

Figure 1 represents a plan view of the machine provided with two springs, both of which are under tension. Fig. 2 is a longitudinal section of the machine drawn on line *x—x* of Fig. 1. Fig. 3 is an end view, part in section, and Fig. 4 is a transverse section drawn on line *y—y* of Fig. 1.

Like parts are identified by the same reference numerals throughout the several views.

1, 1 represent a pair of springs as connected with the machine preparatory to being tested. The springs are connected at their respective ends with the end members 2 of the machine by bolts 3, brackets 4, links 5, and pivotal bolts 6, 6, and such springs are each connected at their centers with the driving pulley 7 through the pulley supporting shaft 8, pinions 9, 9 carried by said shaft, gears 10, 10, gear supporting shafts 11, 11, eccentric cranks 12, 12, crank pin 13, slidable journal box 14, reciprocating member 15 provided with a vertical aperture 16 and two longitudinal apertures 17, 17, screw threaded shafts 18, 18, clamping plates 19, 19 and clamping bolts 20, 20, whereby as said driving pulley 7 is revolved a reciprocating movement will be communicated through the connecting mechanism named to said springs 1, 1, and whereby as said reciprocating member 15 is moved toward the right the spring upon the right will be compressed while the spring upon the left will be expanded while by a continuation of the movement of said driving pulley the movement of said coöperating parts will be reversed and the spring upon the left will be compressed and the spring upon the right will be expanded, whereby the expansive force of the compressed springs will coöperate with the machine in compressing the opposite spring. 7' is an idler of ordinary construction which is revolubly supported by said shaft 8. It will be understood that when the springs have been attached to the links 5, as shown in Fig. 1, the nuts 21, 21 are both turned downward toward the ends of said shafts 18 against the opposing surface of the reciprocating members 15, whereby both of said springs 1 are put under tension, as shown in Fig. 1. It therefore follows that as soon as a machine is started one of said springs will be compressed while the tension of the opposite spring will coöperate, as stated, with the machine in applying pressure to the opposite spring.

The mechanism described is supported from the floor through the legs 22 and platform 23 which together form the frame members of the machine. The shaft 8 is supported from the platform 23 through a pair of brackets 24, each of which brackets are in turn secured to the platform by bolts 25. The shafts 11, 11 are connected with the platform 23 through the journal boxes 26. As the machine is operated the journal box 14 is caused to reciprocate upwardly and downwardly in the retaining apertures 16 while the reciprocating member 15 is caused to move toward the right and left with each revolution of the crank pin 13. The respective ends of the reciprocating member 15 are supported from the platform 23 in the groove 23' (see Fig. 4) beneath the guide plates 27, which plates are in turn secured to the platform by a plurality of bolts 28. The brackets 4 are adjustably connected with the members 2 by the bolts 3, whereby they are adapted to be adjusted nearer to or farther from each other, according to the length of the springs which are being tested. The heads of the bracket retaining bolts 3 operate in the longitudinal slots 29, whereby when the nuts 30 on said bolts are released, said bolts and brackets are free to be adjusted, whereby the brackets 4 may, as stated, be adjusted nearer to or farther from each other when said nuts 30 are again turned down against the bracket, whereby the brackets are securely retained in place.

That the relative durability of the springs may be ascertained, I preferably locate an ordinary counting machine 31 in such a manner that its operating arm, or lever, 32 will be acted upon by a moving part of the machine. In the present device the arm 32 is so located as to be actuated by contact with the bracket 33 which is rigidly secured to the reciprocating member 15 in any convenient manner, whereby each vibration of the springs will be registered in the ordinary manner.

The platform 23 is preferably provided at its respective ends with a plurality of bearings 34 upon which the springs 1 are adapted to rest as they are being tested.

While I have shown and described a single spring only connected with the respective ends of the reciprocating member 15, it is obvious that if desired a plurality of springs may, in substantially the same manner, be connected with such reciprocating member, whereby the expansive force of all of the springs at one end of such reciprocating member may be simultaneously utilized to coöperate with the machine in compressing the springs at the opposite end of such reciprocating member.

Having thus described my invention what I claim as new and desire to secure by Letters Patent is—

1. In a device of the described class, the combination of a motor driven shaft, a reciprocating member, means for communicating motion from said shaft to such reciprocating member, means for connecting a vehicle spring with the respective ends of such reciprocating member, means for regulating the tension between said springs and the respective ends of said reciprocating member, whereby the expansive force of one spring will coöperate with the driving mechanism of the machine to compress the other spring.

2. In a device of the described class, the combination of a motor driven shaft, a reciprocating member, means for communicating motion from said shaft to such reciprocating members, means for pivotally connecting a pair of vehicle springs at their respective ends with a supporting member, means for connecting each of said springs at its center with the opposite ends of said reciprocating member and means for regulating the tension between said springs and the respective ends of said reciprocating member.

3. In a device for testing vehicle springs, the combination of a motor driven shaft, a pair of pinions carried by said shaft, a crank supporting shaft, a pair of gears mounted on said crank supporting shaft, said gears being adapted to mesh with and be driven by said pinions, a reciprocating member connected with said crank supporting shaft, means for adjustably connecting the respective ends of said reciprocating member with the centers of said vehicle springs respectively and means for pivotally connecting the respective ends of said springs with a stationary support.

4. In a device of the described class, the combination of a motor driven shaft, a reciprocating member, means for connecting one or more vehicle springs with the respective ends of said reciprocating member, whereby as said shaft is revolved the spring, or springs, connected with one end of said reciprocating member will be compressed, while the spring, or springs, connected with the opposite end of said reciprocating member will be expanded, whereby the expansive pressure of the spring, or springs, at one end of the machine will coöperate with the driving mechanism of such machine in compressing the spring, or springs, at the opposite end of such machine and means for automatically counting and registering the vibrations of the machine in testing such springs.

5. In a device of the described class, the combination of a motor driven shaft, a reciprocating member, means for connecting one or more vehicle springs with the respective ends of said reciprocating member, whereby as said shaft is revolved the spring, or springs, connected with one end of said reciprocating member will be compressed, while the spring, or springs, connected with the opposite end of said reciprocating member will be expanded, whereby the expansive pressure of the spring, or springs, at one end of the machine will coöperate with the driving mechanism of such machine in compressing the spring, or springs, at the opposite end of such machine, means for automatically counting and registering the vibrations of the machine in testing such springs and means for supporting such springs while being tested.

6. In a device for testing vehicle springs, the combination of a motor driven shaft, a pair of pinions carried by said shaft, a crank supporting shaft, a pair of gears mounted on said crank supporting shaft, said gears being adapted to mesh with and be driven by said pinions, a reciprocating member connected with said crank supporting shaft, means for adjustably connecting the respective ends of said reciprocating member with the centers of said vehicle springs, means for pivotally connecting the respective ends of said springs with a stationary support, means for automatically registering the vibrations of the machine in testing such springs and means for supporting such springs as they are being tested.

In testimony whereof I affix my signature in the presence of two witnesses.

EDWARD J. HARVEY.

Witnesses:
VIRGINIA GEORGE,
ADOLPH R. JANECKY.

Copies of this patent may be obtained for five cents each, by addressing the "Commissioner of Patents, Washington, D. C."